United States Patent
Rayes et al.

(10) Patent No.: US 8,261,355 B2
(45) Date of Patent: Sep. 4, 2012

(54) TOPOLOGY-AWARE ATTACK MITIGATION

(75) Inventors: Ammar Rayes, San Ramon, CA (US); Zhiyun Qian, Ann Arbor, MI (US)

(73) Assignee: Cisco Technology, Inc., San Jose, CA (US)

(*) Notice: Subject to any disclaimer, the term of this patent is extended or adjusted under 35 U.S.C. 154(b) by 525 days.

(21) Appl. No.: 12/509,297

(22) Filed: Jul. 24, 2009

(65) Prior Publication Data

US 2011/0023119 A1 Jan. 27, 2011

(51) Int. Cl.
*H04L 29/06* (2006.01)
(52) U.S. Cl. ............................................. 726/25; 726/22
(58) Field of Classification Search ............... 726/23, 726/22, 24, 25, 2, 3, 6, 11, 14, 13; 707/705, 707/781, 782, 783, 784, 785; 709/223, 224, 709/225, 229, 220–222
See application file for complete search history.

(56) References Cited

U.S. PATENT DOCUMENTS

| | | | |
|---|---|---|---|
| 2006/0031444 A1* | 2/2006 | Drew et al. | 709/223 |
| 2008/0244741 A1* | 10/2008 | Gustafson et al. | 726/23 |
| 2008/0244745 A1* | 10/2008 | Hrabik et al. | 726/23 |
| 2008/0320592 A1* | 12/2008 | Suit et al. | 726/23 |
| 2009/0077225 A1* | 3/2009 | Mathur et al. | 709/224 |
| 2009/0320130 A1* | 12/2009 | Jin et al. | 726/22 |
| 2010/0023610 A1* | 1/2010 | Venugopal et al. | 709/223 |

OTHER PUBLICATIONS

D. Brent Chapman & Elizabeth D. Zwicky; Building Internet Firewalls, Nov. 1995, 1st Edition, Chapter 6.1.*

* cited by examiner

*Primary Examiner* — Edward Zee
(74) *Attorney, Agent, or Firm* — Patterson & Sheridan, LLP

(57) ABSTRACT

Techniques are disclosed for preventing malicious attacks or other exploits on a computer server. A network manager may be configured to determine a topology of a plurality of network devices and deploy an intrusion prevention system in one or more of the network devices to mitigate attacks against the vulnerable servers. The one or more network devices may be identified based on the topology and one or more constraints for optimizing the deployment of the intrusion prevention systems.

20 Claims, 6 Drawing Sheets

TOPOLOGY-AWARE ATTACK MITIGATION

TECHNICAL FIELD

The present disclosure relates generally to preventing malicious attacks that may exploit vulnerabilities on a server.

BACKGROUND

As the internet has grown, malware has become a major concern for businesses and individuals connected to the internet and other networks. Malware (i.e., worms, spyware, etc.) may target particular vulnerabilities of applications that may be running on a server. For example, server applications are widely available to respond to messages from any requesting party (e.g., a web server configured to respond to HTTP requests) and network messages may be crafted with payloads intentionally designed to exploit a vulnerability of a server. For example, a network message may include a payload that causes a buffer overflow on a vulnerable system, allowing a remote attacker to execute arbitrary shell code on a host system.

Because of the large number and variety of malware attacks that occur today, security systems, known as intrusion prevention systems (IPS) have been developed to automatically block malicious traffic using a database of malicious payload signatures. For example, a network administrator may deploy an IPS on a host system or at a gateway edge between a local network and the internet. When the IPS detects a malicious payload signature in a payload addressed to a server on that host, it may simply drop that message. That is, the IPS intercepts the message, preventing it from being forwarded towards a destination. Further, the IPS raises an alarm and even blocks future traffic from the source address.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION

Overview

Figure 1:
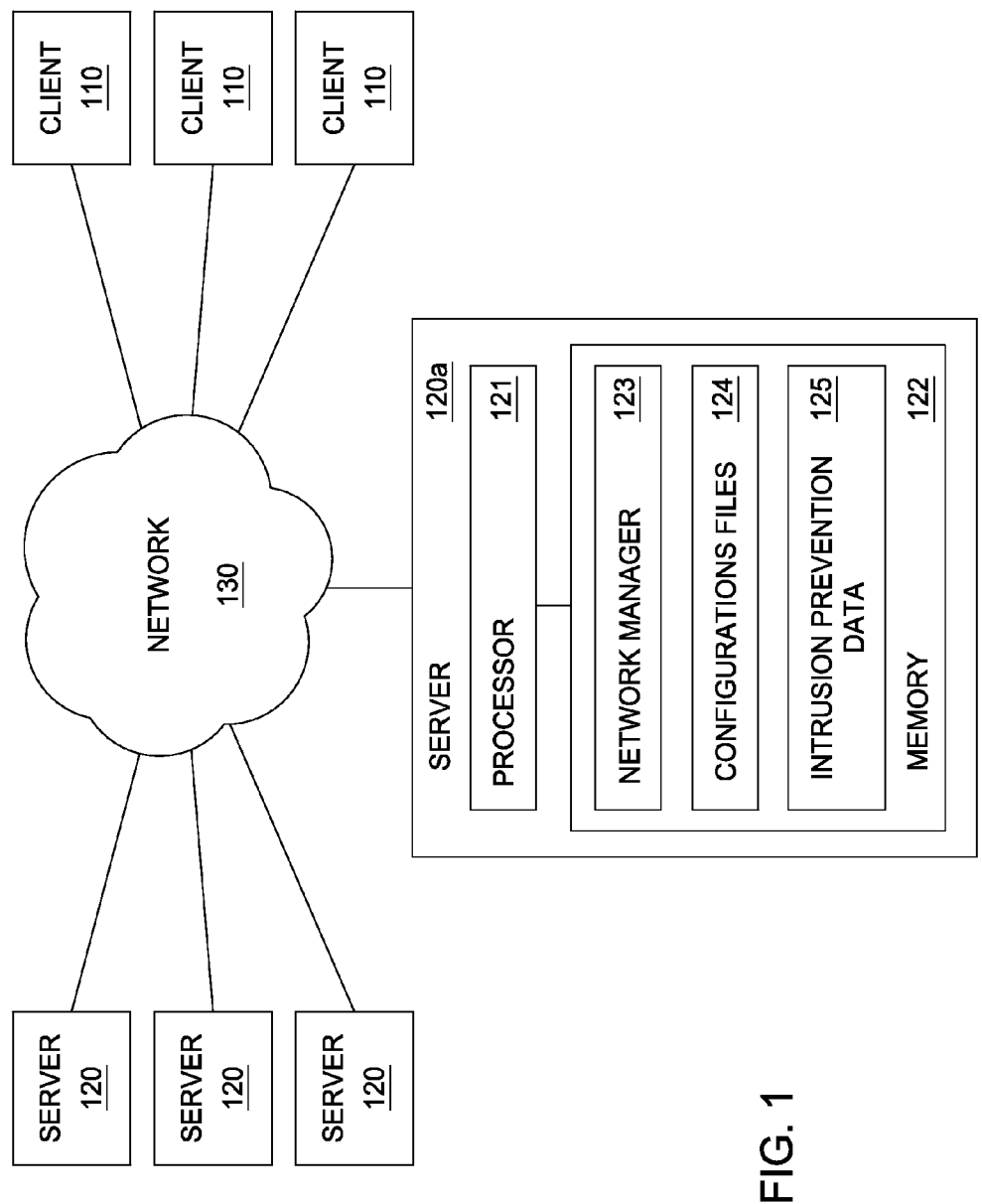
FIG. 1 illustrates an example networked system according to an embodiment.

Certain embodiments of the present disclosure relate to techniques and corresponding apparatus for preventing malicious attacks that may exploit vulnerabilities on a server. In a particular embodiment, one of a plurality of constraints may include reducing the total number of network devices to which the intrusion prevention feature is deployed. Alternatively, one of the constraints may include reducing the total number of servers disrupted while deploying the intrusion prevention feature. One of the constraints may also include reducing increases in management complexity of a network.

The intrusion prevention feature itself may be an access control list ("ACL") configured to specify particular access privileges that are available to different users, systems, groups, or devices. Similarly, the intrusion prevention feature may involve configuring a firewall configured to block unwanted traffic to the one or more servers or installing a packet filter on a network device, the filter being configured to identify packets to drop from routing.

DETAILED DESCRIPTION OF EXAMPLE EMBODIMENTS

Embodiments of this disclosure relate to preventing malicious attacks that may exploit vulnerabilities on a server. More specifically, described embodiments provide network topology-aware attack mitigation for vulnerable servers. A network manager may be configured to determine a topology of a plurality of network devices and deploy an intrusion prevention feature to one or more of the network devices to mitigate attacks against the vulnerable servers. The one or more network devices may be identified based on the topology and one or more constraints for optimizing the deployment of the intrusion prevention features.

In the following, reference is made to various embodiments. However, it should be understood that the claims are not limited to specific described embodiments. Instead, any combination of the following features and elements, whether related to different embodiments or not, is contemplated. Furthermore, in the various embodiments described provide numerous advantages over the prior art. However, although the embodiments may achieve advantages over other possible solutions and/or over the prior art, whether or not a particular advantage is achieved by a given embodiment is not limiting on the claims. Thus, the following aspects, features, embodiments and advantages are merely illustrative and are not considered elements or limitations of the appended claims except where explicitly recited in a claim(s). Likewise, reference to "the embodiments" shall not be construed as a generalization of any inventive subject matter disclosed herein and shall not be considered to be an element or limitation of the appended claims except where explicitly recited in a claim(s).

Additionally, the application programs disclosed herein may be distributed on a variety of computer-readable storage media. Illustrative computer-readable storage media includes, but is not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. For example, as described in greater detail herein, one embodiment includes a computer-readable storage medium containing a program, which when executed on a processor is configured perform an operation to mitigate attacks against vulnerable servers.

In general, the routines executed to implement the embodiments, may be part of an operating system or a specific application, component, program, module, object, or sequence of instructions. The computer program of the present disclosure typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the disclosure. However, it should be appreciated that any particular program nomenclature that follows is used merely for convenience, and thus this disclosure should not be limited to use solely in any specific application identified and/or implied by such nomenclature.

FIG. 1 illustrates an example networked system 100, according to an embodiment of this disclosure. As illustrated in FIG. 1, the networked system 100 may include one or more client devices 110 (three clients 110 are shown in FIG. 1) coupled with one or more servers 120 (three servers 120 are shown in FIG. 1) via a network 130. In general, the network 130 is included to be representative of be any one of a local area network (LAN), a wide area network (WAN), Metropolitan Area Network (MAN), or the like. In a particular embodiment, the network 130 is the Internet. In one embodiment, the network 130 may include any combination of wired and/or wireless sub-networks. The network 130 may include a plurality of interconnected network devices (not shown in FIG. 1) such as, for example, gateways, routers, bridges, switches, hubs, repeaters, and the like.

In general, the servers 120 may include at least one processor configured to execute instructions of one or more applications stored in a memory device. For example, the server 120a in FIG. 1 includes a processor 121 coupled to a memory 122. CPU 121 is included to be representative of a single CPU, multiple CPUs, a single CPU having multiple processing cores, and the like. The memory 122 is preferably a random access memory sufficiently large to hold necessary programming to perform one or more operations described herein.

In one embodiment, the memory 122 may store a network manager 123, as illustrated in FIG. 1. The network manager 123, when executed by the processor 121, may perform an operation for mitigating attacks the servers 120 coupled to the network 130, as is described in greater detail below. For example, the network manager 123 may be configured to deploy an intrusion prevention feature on one or more network devices of network 130 that are coupled with the servers 120, thereby mitigating attacks thereon.

Any reasonable type of intrusion prevention feature may be deployed to the network devices including, for example, configuring an Access Control List (ACL) to guard against certain untrusted IP ranges and/or ports, configuring a firewall to stop unwanted traffic, installing an appropriate packet filter based on signatures for identifying malicious payload, applying a software patch on network devices or the servers 120, enabling built-in security features. For example, in some embodiments, the network devices may include built-in security features that provide source IP address filtering on a Layer 2 port to prevent a malicious host from impersonating a legitimate host by assuming the legitimate host's IP address. For the sake of convenience, the intrusion prevention features are hereinafter simply referred to simply as filters.

In one embodiment, the network manager 123 may be configured to determine an optimum number of particular network devices on which filters can be deployed to protect the plurality of servers. The particular network devices may be determined based, at least in part, on a topology of the network devices in the network 130. Therefore, in one embodiment, the network manager 123 may be configured to retrieve configuration files from one or more network devices in the network 130. The configuration files for each device may include, for example, a unique device ID, a list of other devices with which the network device is interfaced, and other like information which may be used to determine a topology of the network devices. The retrieved configuration files may be stored as the configuration files 124 in memory 122, as shown in FIG. 1.

In one embodiment, the number network devices on which filters are deployed may be optimized based on one or more constraints. Example constraints may include reducing the number of devices on which the interference prevention systems must be deployed, reducing service disruptions, reducing management complexity, or the like. Example constraints are discussed below in greater detail.

In one embodiment, the memory 122 may also include intrusion prevention data 125. The intrusion prevention data 125 may include detailed information regarding how to prevent a specific type of vulnerability from being exploited. For example, to prevent certain types of Denial-of-Service attacks, the intrusion prevention data 125 may indicate that an Access Control List (ACL) may be deployed at a network device to filter traffic on a predefined port, e.g., port 1516, when messages are received from untrusted IP sources are received. However, based on the type of network device, the type of vulnerability, type of attack, and the like, any other type of filter such as, for example, firewalls, packet filtering, or the like may be included in the intrusion prevention data 125.

Optimizing Deployment of Intrusion Prevention Features

Figure 2:
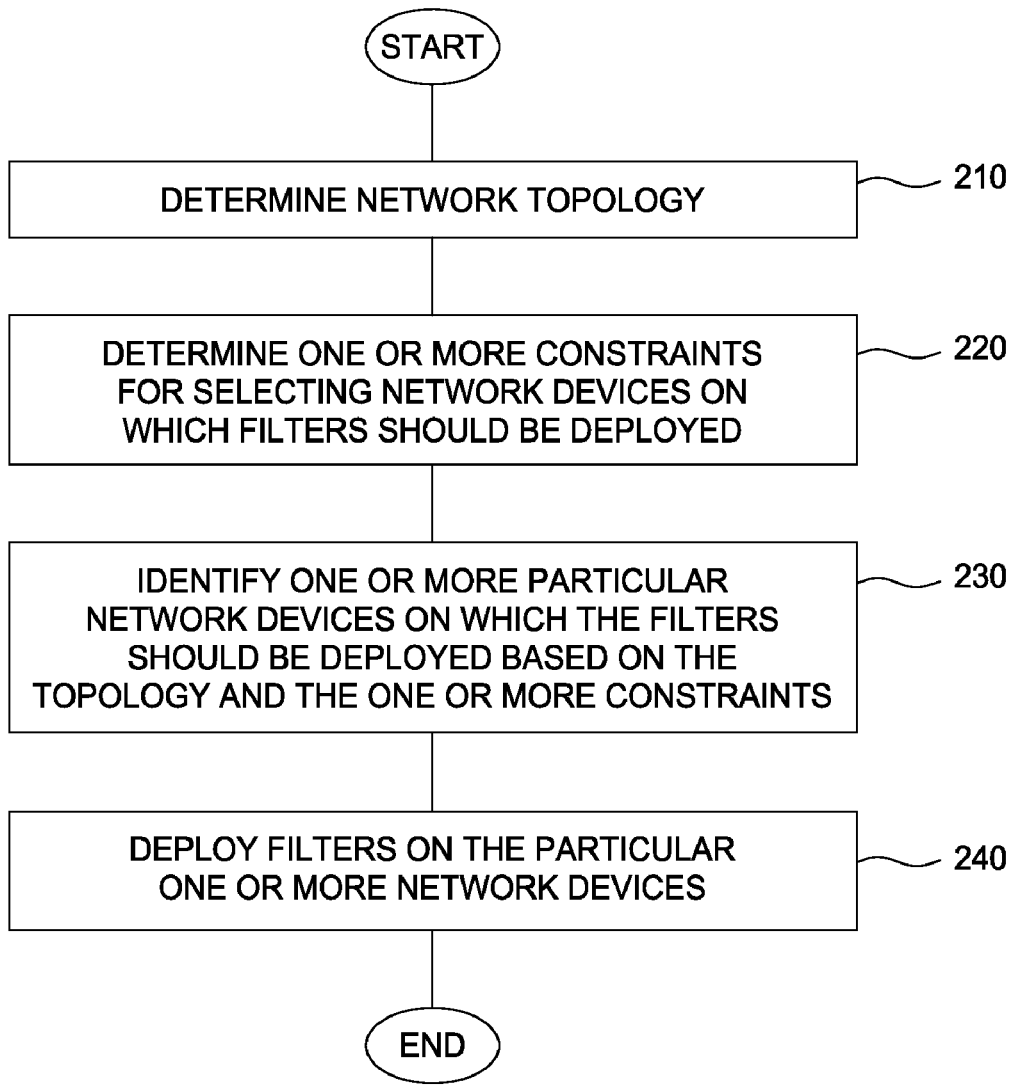
FIG. 2 is a flow diagram of example operations performed by a network manager according to an embodiment.

FIG. 2 is a flow diagram of example operations performed by a network manager 123 to mitigate attacks against a plurality of servers 120, according to an embodiment of the disclosure. The operations may begin in step 210 by determining a network topology of one or more network devices coupled with the servers 120. For example, in one embodiment, the network manager 123 may access the configuration files 124 and determine a topology of the network devices based on data included in the configuration files. In step 220, the network manager 123 may determine one or more constraints for selecting network devices on which the filters should be deployed. For example, the network manager 123 may generate a graphical user interface prompting a user to input one or more constraints. Alternatively, the network manager 123 may be configured to automatically select one or more predefined constraints.

In step 230, the network manager 123 may identify one or more particular network devices on which the filter should be deployed (i.e., determine vulnerable/untrusted devices) based on the topology of the network devices and the constraints. Thereafter, in step 240, the network manager 123 may deploy the filters on the particular one or more network devices.

Figure 3:
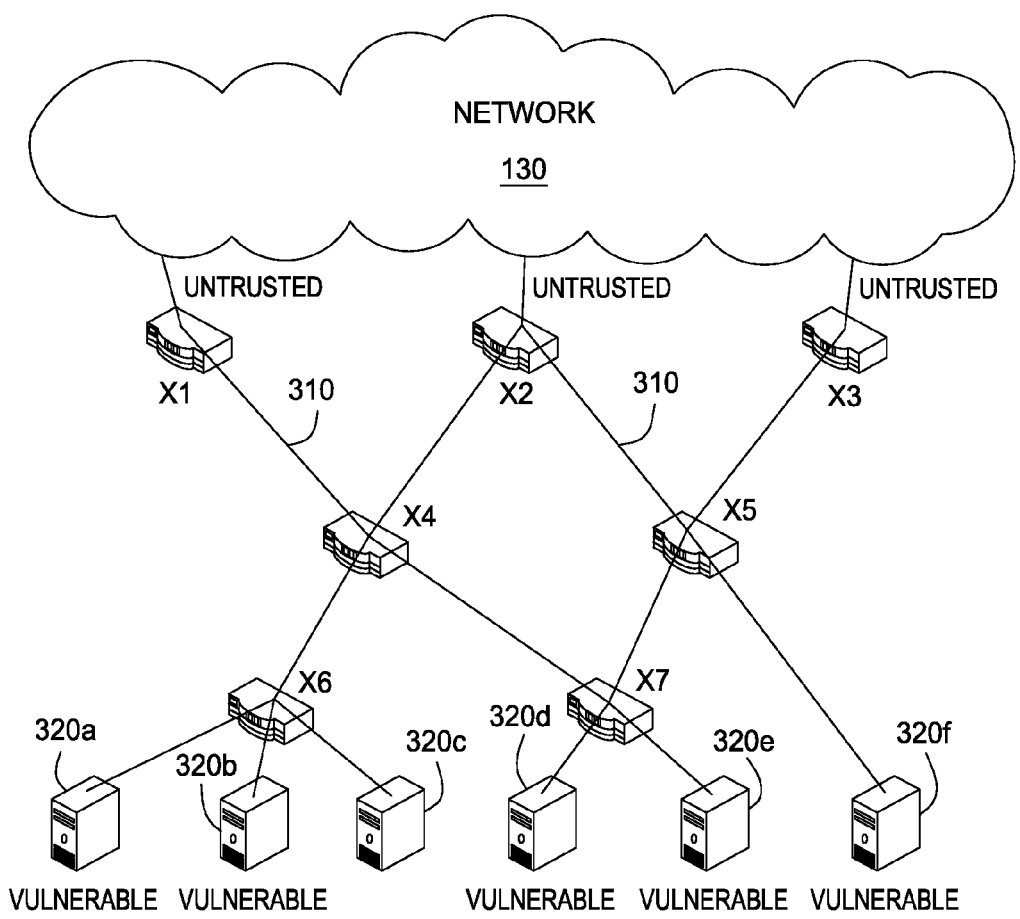
FIGS. 3, 4, 5A and 5B illustrate a topology of network devices according to an embodiment.

FIG. 3 illustrates an example network topology 300 according to an embodiment. As illustrated in FIG. 3, a plurality of servers 320a-f may be coupled with the network 130 via a plurality of network devices $x_1$-$x_7$. In one embodiment, the network devices $x_1$-$x_7$ may be a part of a local area network that coupled the servers 320 to each other and a larger network 130. The network devices $x_1$-$x_7$ may include, for example, gateways, routers, bridges, switches, hubs, repeaters, and the like. In a particular embodiment, the network devices $x_1$-$x_3$ may be edge routers because they interface directly with the network 130.

As indicated in FIG. 3, a network manager 123 may determine that the servers 320a, 320b and 320d-f are vulnerable to attack, and that server 320c is not vulnerable to attacks. The determination of whether a server is vulnerable may be made based on a variety of factors including, for example, the type of the server, applications installed on the server, discovery of a new worm or other malware, and the like.

As illustrated further in FIG. 3, a plurality of communication paths 310 may be defined between the servers 320a-f and the network 130 via the network devices $x_1$-$x_7$. For example, server 320a is coupled to the network 130 via a path through network devices $x_4$, and $x_6$. The server 320a is also coupled to the network 130 via a path through network devices x2, x4 and x6. Similarly, one or more paths coupling each of servers 320b-c to the network 130 are shown in FIG. 3. Because the edge routers $x_1$-$x_3$ fall along at least one path that couples one of vulnerable servers 320a, 320b, and 320d-f, the edge routers $x_1$-$x_3$ are shown as being coupled to an untrusted source in the network 130.

The paths 310 in the topology 300 are shown as undirected paths. This means that traffic can go both directions on each path despite the destination IP address. However, in some cases, routing policy and existing ACL filters can introduce directional elements in the paths. For example, if the routing is based on destination IP, it may be the case that a packet going from $x_5$ to $x_1$ has to go through $x_4$ and $x_7$ rather than $x_4$ and $x_2$. Based on destination IP addresses and a routing table on each router, directed paths may be used and the routing policy can be taken into consideration to reduce some unneeded paths for some destination IP address. However, routing may change from time to time (e.g., one router dies) so that the path to reach the vulnerable devices can change correspondingly. This could cause potential problem if the previously installed filters or ACLs installed did not cover this new path. Accordingly, in some embodiment, the network manager 123 may be configured to perform the operations described hereinabove with respect to FIG. 2 periodically, or upon detecting predefined events such as failure of a network device.

As discussed above, a network manager 123 may be configured to deploy interference prevention systems in the network devices $x_1$-$x_7$ when vulnerabilities are discovered in the servers 320a-f. For example, assume that none of the network devices $x_1$-$x_7$ of FIG. 2 have a filter deployed therein. In one embodiment, upon discovering that servers 320a, 320b, and 320d-f are vulnerable, it may be desirable to deploy interference prevention systems in network devices along each communication path that couples a vulnerable server to the network 130.

One simple solution may be to deploy the interference prevention systems in all of the network devices $x_1$-$x_7$. However, this solution may not be optimal because the interference prevention systems may only be necessary in one network device in any given path coupling a vulnerable server 320 to the network 130. Furthermore, deploying the interference prevention systems to all the network devices may greatly increase the cost and complexity of maintaining the system. For example, if an access control list entry is used to mitigate attacks against the servers 320a-f, access control lists in all of the network devices $x_1$-$x_7$ must be maintained up to date and synchronized, which may be tedious and wasteful. Therefore, in one embodiment, it may be desirable to deploy the filters in a reduced number of network devices.

Another solution may be to deploy the filters at all edge routers, for example, the edge routers $x_1$-$x_3$, because all communication traffic to the servers 320a-f passes through one of the edge routers $x_1$-$x_3$. However, deploying the filters (IPS) to all the edge routers may also not be an optimal solution in some cases. For example, in FIG. 3 there are three edge routers $x_1$-$x_3$. However, it may be possible to protect vulnerable servers by deploying the filters to less than three network devices depending on the topology.

Figure 4:
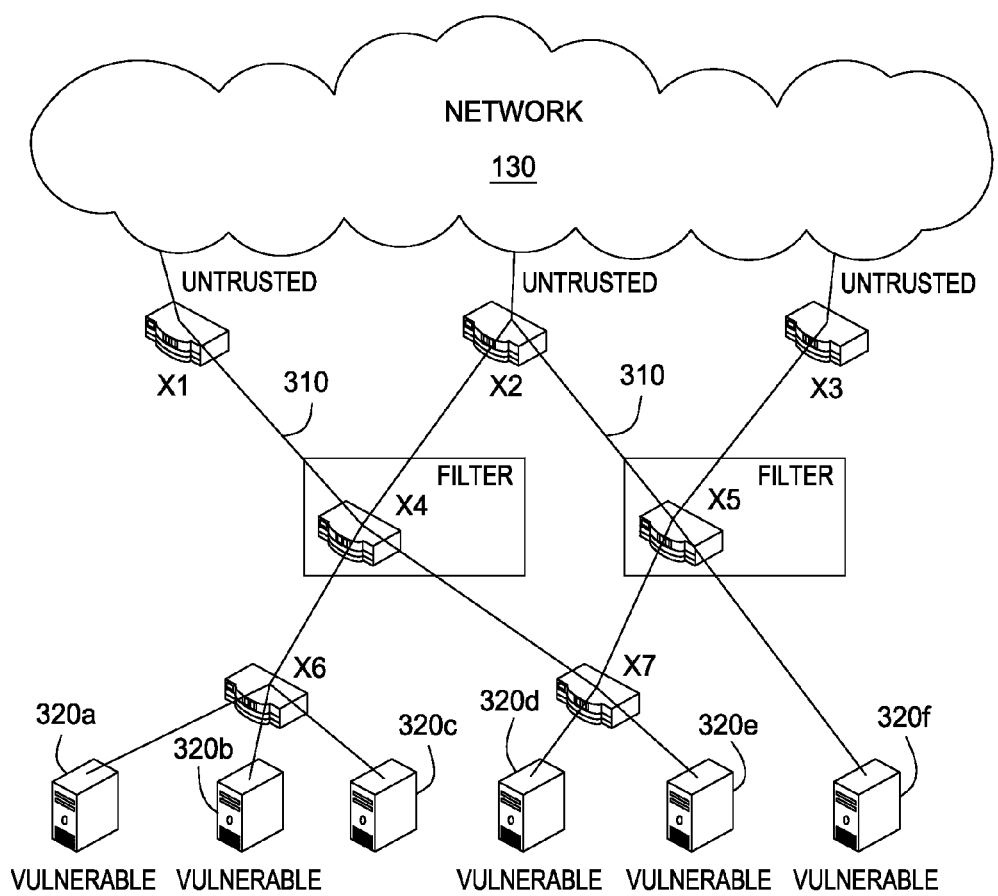

In one embodiment, the network manager is configured to make intelligent decisions regarding the particular network devices in which the IPSs are deployed based on the topology of the network devices and one or more constraints. FIG. 4 illustrates the network devices in which IPSs have been deployed based on the topology of FIG. 3 and a constraint requiring that the IPSs be deployed in a reduced number of devices. As illustrated in FIG. 4, IPS filters 410 are deployed in two network devices, i.e., $x_4$ and $x_5$ to protect the servers 320a, 320b and 320d-f from a known vulnerability. This is possible because all paths to the servers 320a, 320b, and 320d-f pass through one of network devices $x_4$ and $x_5$.

While deploying IPS filters is described hereinabove, any other technique for preventing intrusions, for example, access control lists (ACLs), firewalls, or the like may be deployed at the network devices by the network manager 123. The particular type of filter deployed may depend on the intrusion prevention data 125 (see FIG. 1). Furthermore, while reducing the number of network devices in which the IPSs are deployed is described as a constraint, any other reasonable constraint or combination of constraints may be considered which may result in a different set of network devices being identified for deploying the IPSs.

In one embodiment, the particular network devices to which the IPSs may be deployed may be determined using integer programming. Integer programming (IP) is a special case of linear programming (LP). LP involves the optimization of a linear objective function, subject to linear equality and/or inequality constraints. In other words, LP problems determine the way to achieve the best outcome given a list of requirements, represented as linear equations. If the unknown variables are all required to be integers, then the problem is called integer programming.

The following paragraphs illustrate an example in which integer programming equations is used to optimize deployment of IPSs to network devices $x_1$-$x_7$ of FIG. 3 for a constraint that requires that the IPSs be deployed in a reduced number of devices. For the purposes of this example, the variable $x_i$ is defined as a binary integer variable for every network device in the network. In one embodiment, $x_i$ may indicate whether the corresponding network device is configured to defend the attack. For example if $x_i=1$, then the network device may be configured to defend the attack, while $x_i=0$, then the network device may not be configured to defend the attack. Once the network device is configured, then it can be applied to any number of interfaces on that device without counting them multiple times.

In one embodiment, the integer programming objective function for the aforementioned constraint may be $\Sigma_{i=1\ to\ m} x_i$, wherein the goal may be to minimize the objective function, i.e., the total number of configured network devices. The following constraints may also be applied:

1. $x_i >= 0$ for each $1<=i<=m$. (Note in FIG. 3, m=7 because there are 7 network devices.)
2. Every path from the untrusted link to a vulnerable server must encounter at least one interface that belongs to the network device $x_i$ which has been configured to defend against the attack.

Condition 1 above simply states that the values for $x_i$ must be greater than or equal to zero so that negative results are not returned.

Based on the topology of the network devices $x_1$-$x_7$, the following equations may be derived for condition 2:

$$x_1+x_4+x_6>=1$$

$$x_1+x_4+x_5>=1$$

$$x_1+x_4+x_7>=1$$

$$x_2+x_4+x_6 >= 1$$

$$x_2+x_4+x_7 >= 1$$

$$x_2+x_5+x_7 >= 1$$

$$x_3+x_5 >= 1$$

The equations above represent a plurality of paths that connect the vulnerable servers 320a, 320b, and 320d-f to the network 130 in FIG. 3. For a different topology, however, a different set of equations may be derived. Solving the objective function based on the equations associated with conditions 1 and 2 above using integer programming will result in the following solution:

$$x_4=1$$

$$x_5=1$$

All other network devices=0

In other words, the solution indicates that the IPS should be deployed only to devices x4 and x5 and not the other devices to protect the servers 320 while deploying the IPSs to a reduced number of devices.

Figure 5A:
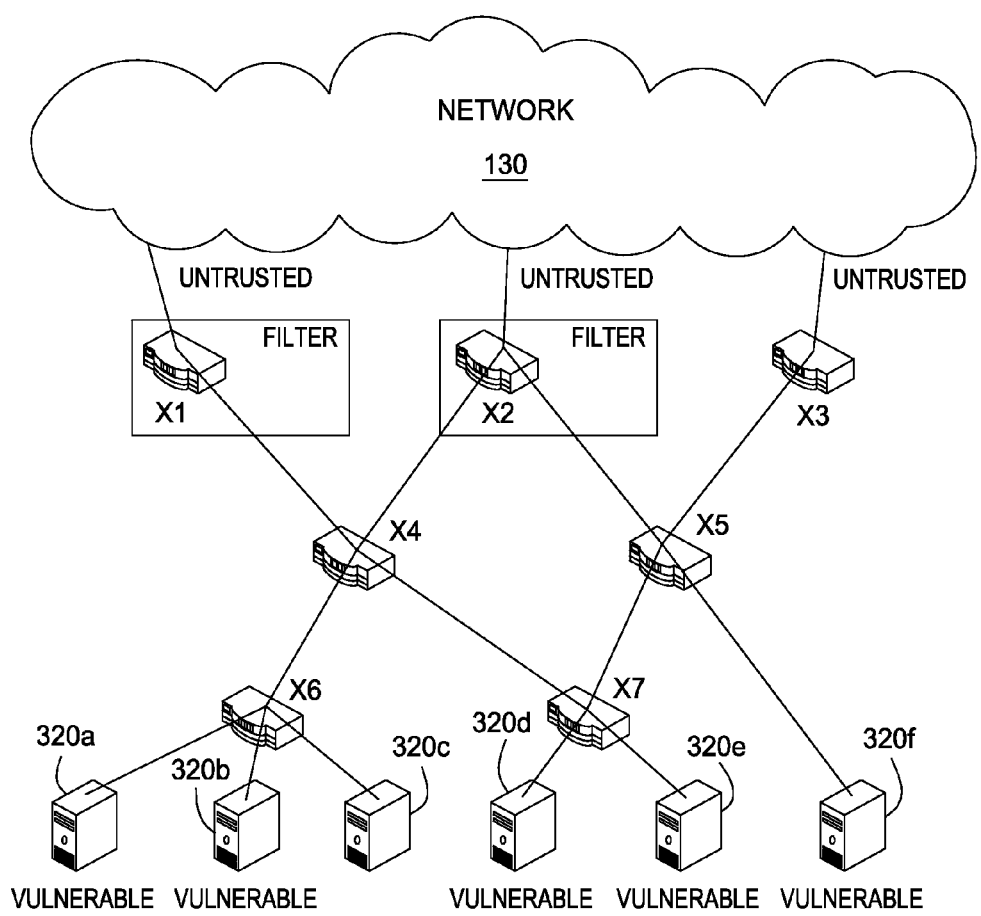
Figure 5B:
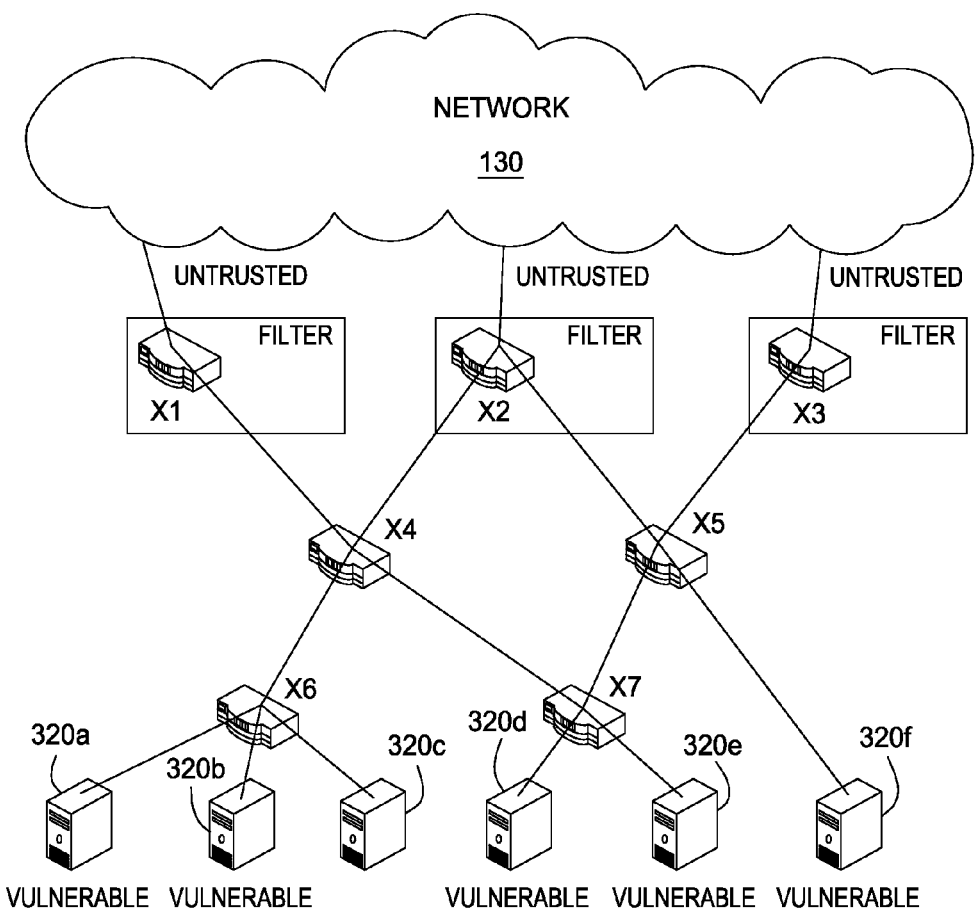

FIGS. 5A-5B illustrate an example wherein reducing network disruptions is used as a constraint. Reducing network disruptions may involve reducing a number of servers and/or an amount of time for which one or more servers become unavailable. For example, the network manager may determine a minimal number of changes to a current network topology and/or device state required to achieve a fully protected state. That is, a state where each server is protected from a known vulnerability, based on a topology of the network devices connecting servers to untrusted networks 130. FIG. 5A illustrates the network devices $x_1$-$x_7$ prior to IPS deployment operations that may be performed by the network manager 123. As shown in FIG. 5A, an IPS may already be provided in network devices $x_1$ and $x_2$.

Based on the topology and the aforementioned constraint, in one embodiment, the network manager may simply deploy an IPS to the network device x3 to protect servers 320a, 320b and 320d-f from attacks. FIG. 5B illustrates the network devices $x_1$-$x_7$ after an IPS has been deployed at network device x3. Deploying the IPS to network device x3 may be the optimal solution, in this case, because none of the servers 320a-f are affected if the paths via the network device x3 become unavailable during deployment of the IPS. In other words, the servers 320a-f have alternative paths to communicate with the network 130 via the network devices $x_1$ and $x_2$, and therefore will not become unavailable due to the deployment of an IPS at the network device $x_3$.

In one embodiment, the objective function for achieving reduced disruption may be $\Sigma_{i=1 \text{ to } y} z_i$ (for y interfaces), wherein $z_i$ is a binary integer variable for every network interface in the network 130. The conditions for solving the objective function may be:

3. $z_i >= 0$ for each $1 <= i <= y$.
4. Every path from the untrusted link to a vulnerable server must encounter at least one interface which has been configured to defend against the attack.

While reducing the number of network devices and reducing service interruptions are described hereinabove as examples of constraints for deploying IPSs to network devices, in alternative embodiments, any reasonable type of constraint may be applied. For example, in some cases, it may be desirable to optimize IPS deployment based on complexity of the system.

Illustratively, if an access control list (ACL) is used to defend against an attack and $o_i$ represents a number of ACL entries needed for the corresponding interface, it may be determined that $o^2$ is the management complexity of a given interface. Accordingly, in one embodiment, it may be determined that the objective function is $\Sigma(((o_i+1)^2-o^2) a_i)$, wherein $a_i$ as a binary integer variable for every network interface in the network. The goal may be to minimize the objective function, where $((o_i+1)^2-o^2)$ is the amount of management complexity increased by adding a new ACL entry on a interface. The conditions for solving the objective function above may be:

5. Each $a_i >= 0$.
6. Every path from the untrusted link to a vulnerable server must encounter at least one interface which has been configured to defend against the attack.

While the constraints, for example, reduced network devices and reduced disruptions are analyzed individually in the examples hereinabove, in some cases, one or more constraints may be combined. For example, it may be desirable to achieve a reduced number of network devices and a reduced number of disruptions while deploying the IPSs. An example of an objective function that is minimized to achieve these combined constraints may be $\Sigma_i x_i + \Sigma_i g_i x_i$, wherein $x_i$ is a binary integer variable for every network interface in the network, and $g_i$ is a coefficient which, for every $x_i$, $g_i=1/j$, where j is the number of interfaces on the network device to which $x_i$'s corresponding interface belongs. The reason for having the coefficient $g_i$ is that a cluster of interfaces on the same device is encouraged since it may have less weight. The conditions for solving the objective function above may be:

7. Each $x_i >= 0$.
8. Every path from the untrusted link to the vulnerable device must encounter at least one interface that is configured to defend against the attack.

In one embodiment, a plurality of different types of defense mechanisms may be available for any given vulnerability. For example, a network device or server may be protected against a given vulnerability using either one of a filter and a patch or upgrade operation. The intrusion prevention data 125 (see FIG. 1) may include the different types of defense mechanisms for any given vulnerability. Accordingly, in one embodiment, it may be possible to define an additional integer variable for each potential type of defense for a given vulnerability for each device (yi). If the variable is assigned to 1, then it indicates that the device will be patched with a particular piece of patch software.

In the examples above, assuming a patch operation (in addition to filters) will eliminate all the vulnerabilities on the particular device, we can reformulate the constraint by adding a variable in the original equations. For example, x1+x4+x6>=1 (example equation for filters only) may be changed to x1+x4+x6+y6>=1 (example equation for filters and patching). The aforementioned equation may indicate that if the vulnerable device 6 is patched, then there is no need to install any filters on the path. Accordingly, the objective function can combine the filter operations and the patch operations. The cost can be defined by a network operator with knowledge about the impact of such operation (e.g., service downtime). An example of such objective function may be $\Sigma_{i=1 \text{ to } m} x_i + \Sigma_{i=1 \text{ to } m} \text{cost}(yi)*yi$, where cost(yi) is defined as the cost for patching device i.

Advantageously, by allowing defense mechanisms to be deployed at optimal network devices based on one or more constraints, embodiments of this disclosure facilitate efficient mitigation of attacks of vulnerable servers.

While the foregoing is directed to embodiments of the present disclosure, other and further embodiments of the disclosure may be devised without departing from the basic scope thereof, and the scope thereof is determined by the claims that follow.

The invention claimed is:

1. A method, comprising:
   determining a topology of a plurality of network devices coupled between one or more servers and one or more untrusted links;
   determining one or more constraints for selecting network devices for deployment of an intrusion prevention feature to prevent attacks on the one or more servers;
   determining a plurality of equations based on the topology, wherein each of the plurality of equations represents a separate path through the plurality of network devices to one of the one or more servers;
   determining a function based on the one or more constraints, the function having an objective for resolving the function;
   resolving the function using integer programming in accordance with the objective, by operation of one or more computer processors, such that all of the plurality of equations and all of the one or more constraints are satisfied, to identify one or more of the plurality of network devices on which to deploy the intrusion prevention feature; and
   deploying the intrusion prevention feature to the identified one or more network devices, whereby all of the one or more servers are protected by at least one of the deployed intrusion prevention features for all the paths from the one or more untrusted links to the one or more servers through the plurality of network devices.

2. The method of claim 1, wherein one of the constraints comprises reducing a total number of network devices to which the intrusion prevention feature is deployed.

3. The method of claim 1, wherein one of the constraints comprises reducing a total number of network devices to which intrusion prevention feature is deployed during deployment of the intrusion prevention feature.

4. The method of claim 1, wherein the one or more constraints comprise reducing network complexity in the plurality of network devices and the servers as a result of deployment of the intrusion prevention feature.

5. The method of claim 1, wherein the intrusion prevention feature comprises an access control list (ACL) configured to specify what access privileges are available to different users or groups or to the servers or the network devices.

6. The method of claim 1, wherein the intrusion prevention feature comprises configuring a firewall configured to block specified network traffic to one or more of the servers.

7. The method of claim 1, wherein the intrusion prevention feature comprises a packet filter configured to identify packets to drop from routing.

8. A non-transitory computer-readable medium comprising a program which, when executed by a processor, performs an operation, comprising:
   determining a topology of a plurality of network devices coupled between one or more servers and one or more untrusted links;
   determining one or more constraints for selecting network devices for deployment of an intrusion prevention feature to prevent attacks on the one or more servers;
   determining a plurality of equations based on the topology, wherein each of the plurality of equations represents a separate path through the plurality of network devices to one of the one or more servers;
   determining a function based on the one or more constraints, the function having an objective for resolving the function;
   resolving the function using integer programming in accordance with the objective, such that all of the plurality of equations and all of the one or more constraints are satisfied, to identify one or more of the plurality of network devices on which to deploy the intrusion prevention feature; and
   deploying the intrusion prevention feature to the identified one or more network devices, whereby all of the one or more servers are protected by at least one of the deployed intrusion prevention features for all the paths from the one or more untrusted links to the one or more servers through the plurality of network devices.

9. The non-transitory computer-readable medium of claim 8, wherein one of the constraints comprises reducing a total number of network devices to which the intrusion prevention feature is deployed.

10. The non-transitory computer-readable medium of claim 8, wherein one of the constraints comprises reducing a total number of network devices to which intrusion prevention feature is deployed during deployment of the intrusion prevention feature.

11. The non-transitory computer-readable medium of claim 8, wherein the one or more constraints comprise reducing network complexity in the plurality of network devices and the servers as a result of deployment of the intrusion prevention feature.

12. The non-transitory computer-readable medium of claim 8, wherein the intrusion prevention feature comprises an access control list (ACL) configured to specify what access privileges are available to different users or groups or to the servers or the network devices.

13. The non-transitory computer-readable medium of claim 8, wherein the intrusion prevention feature comprises configuring a firewall configured to block specified network traffic to one or more of the servers.

14. The non-transitory computer-readable medium of claim 8, wherein the intrusion prevention feature comprises a packet filter configured to identify packets to drop from routing.

15. An apparatus, comprising:
   a memory storing a program; and
   a processor which, when executing the program, is configured to:
   determine a topology of a plurality of network devices coupled between one or more servers and one or more untrusted links;
   determine one or more constraints for selecting network devices for deployment of an intrusion prevention feature to prevent attacks on the one or more servers;
   determine a plurality of equations based on the topology, wherein each of the plurality of equations represents a separate path through the plurality of network devices to one of the one or more servers;
   determine a function based on the one or more constraints, the function having an objective for resolving the function;
   resolve the function using integer programming in accordance with the objective, such that all of the plurality of equations and all of the one or more constraints are satisfied, to identify one or more of the plurality of network devices on which to deploy the intrusion prevention feature; and
   deploy the intrusion prevention feature to the identified one or more network devices, whereby all of the one or more servers are protected by at least one of the deployed intrusion prevention features for all the paths from the one or more untrusted links to the one or more servers through the plurality of network devices.

16. The apparatus of claim 15, wherein one of the constraints comprises reducing a total number of network devices to which the intrusion prevention feature is deployed.

17. The apparatus of claim 15, wherein one of the constraints comprises reducing a total number of network devices to which intrusion prevention feature is deployed during deployment of the intrusion prevention feature.

18. The apparatus of claim 15, wherein the one or more constraints comprise reducing network complexity in the plurality of network devices and the servers as a result of deployment of the intrusion prevention feature.

19. The apparatus of claim 15, wherein the intrusion prevention feature comprises an access control list (ACL) configured to specify what access privileges are available to different users or groups or to the servers or the network devices.

20. The apparatus of claim 15, wherein the intrusion prevention feature comprises configuring a firewall configured to block specified network traffic to one or more of the servers.

* * * * *

UNITED STATES PATENT AND TRADEMARK OFFICE
CERTIFICATE OF CORRECTION

PATENT NO.        : 8,261,355 B2                                Page 1 of 1
APPLICATION NO.   : 12/509297
DATED             : September 4, 2012
INVENTOR(S)       : Rayes et al.

It is certified that error appears in the above-identified patent and that said Letters Patent is hereby corrected as shown below:

In Detailed Description of Example Embodiments:
Column 5, Line 5, please insert -- $x_1$, -- after devices.

Signed and Sealed this
Fifth Day of February, 2013

Teresa Stanek Rea
*Acting Director of the United States Patent and Trademark Office*